(12) United States Patent
Wang et al.

(10) Patent No.: US 12,007,965 B2
(45) Date of Patent: Jun. 11, 2024

(54) METHOD, DEVICE AND STORAGE MEDIUM FOR DEDUPLICATING ENTITY NODES IN GRAPH DATABASE

(71) Applicant: BEIJING BAIDU NETCOM SCIENCE TECHNOLOGY CO., LTD., Beijing (CN)

(72) Inventors: Yifei Wang, Beijing (CN); Yang Wang, Beijing (CN); Yu Wang, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 111 days.

(21) Appl. No.: 17/663,044

(22) Filed: May 12, 2022

(65) Prior Publication Data

US 2022/0269659 A1 Aug. 25, 2022

(30) Foreign Application Priority Data

Sep. 28, 2021 (CN) .......................... 202111144175.6

(51) Int. Cl.
*G06F 16/215* (2019.01)
*G06F 16/901* (2019.01)

(52) U.S. Cl.
CPC ........ *G06F 16/215* (2019.01); *G06F 16/9014* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 2009/0083563 A1* | 3/2009 | Murase | G06F 3/0608 713/324 |
| 2015/0127622 A1 | 5/2015 | Jayaraman | |
| 2020/0349115 A1* | 11/2020 | Gupta | G06F 16/9027 |
| 2020/0387308 A1* | 12/2020 | Volkov | G06F 3/061 |

OTHER PUBLICATIONS

Manghi, Paolo, et al. "Entity deduplication in big data graphs for scholarly communication." Data Technologies and Applications 54.4 (2020): 409-435. (Year: 2020).*
Atzori, Claudio. "GDup: an Integrated, Scalable Big Graph Deduplication System." (2016). (Year: 2016).*
Zhang, Ziqi, Andrea Giovanni Nuzzolese, and Anna Lisa Gentile. "Entity deduplication on ScholarlyData." The Semantic Web: 14th International Conference, ESWC 2017, Portorož, Slovenia, May 28-Jun. 1, 2017, Proceedings, Part I 14. Springer International Publishing, 2017. pp. 85-100. (Year: 2017).*
Extended European Search Report issued in European Application No. 22173622.6, dated Oct. 25, 2022 (9 pages).

* cited by examiner

*Primary Examiner* — Alex Gofman
*Assistant Examiner* — Umar Mian
(74) *Attorney, Agent, or Firm* — Osha Bergman Watanabe & Burton LLP

(57) ABSTRACT

The disclosure provides a method for deduplicating entity nodes in a graph database. The method includes: obtaining a set of entity nodes to be deduplicated from the knowledge graph, in which the set includes a plurality of entity nodes; selecting an untraversed entity node from the set as a target entity node; determining a range located by a node identifier corresponding to the target entity node; determining the target entity node that has appeared in traversed entity nodes according to a deduplicating mode corresponding to the range; and deleting the target entity node from the set.

17 Claims, 6 Drawing Sheets

METHOD, DEVICE AND STORAGE MEDIUM FOR DEDUPLICATING ENTITY NODES IN GRAPH DATABASE

CROSS-REFERENCE TO RELATED APPLICATION

This application claims priority to Chinese Patent Application No. 202111144175.6, filed on Sep. 28, 2021, the entire content of which is incorporated herein by reference.

TECHNICAL FIELD

The disclosure relates to the field of computer technologies, especially to the field of artificial intelligence technologies such as the field of knowledge graph technologies, and in particular to a method for deduplicating entity nodes in a graph database, a device for deduplicating entity nodes in a graph database and a storage medium.

BACKGROUND

In a process of retrieving a knowledge graph in a graph database, there may be duplicated entity nodes in a retrieval result obtained from the knowledge graph and these duplicated entity nodes are likely to affect subsequent processing. Therefore, deduplication on the entity nodes in the result is a technical problem that needs to be solved at the moment.

SUMMARY

A method for deduplicating entity nodes in a graph database is provided. The graph database includes a knowledge graph. The method includes: obtaining a set of entity nodes to be deduplicated from the knowledge graph, in which the set includes a plurality of entity nodes; selecting an untraversed entity node from the set as a target entity node; determining a range located by a node identifier corresponding to the target entity node; determining the target entity node that has appeared in traversed entity nodes according to a deduplicating mode corresponding to the range; and deleting the target entity node from the set.

An electronic device is provided. The electronic device includes: at least one processor and a memory communicatively coupled to the at least one processor. The memory is configured to store instructions executable by the at least one processor, and when the instructions are executed by the at least one processor, the at least one processor is enabled to implement the above method.

A non-transitory computer-readable storage medium having computer instructions stored thereon is provided. The computer instructions are configured to cause a computer to implement the above method.

It should be understood that the content described in this section is not intended to identify key or important features of embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes embodiments of the disclosure with reference to the drawings, which includes various details of embodiments of the disclosure to facilitate understanding and shall be considered merely exemplary. Therefore, those of ordinary skill in the art should recognize that various changes and modifications can be made to embodiments described herein without departing from the scope and spirit of the disclosure. For clarity and conciseness, descriptions of well-known functions and structures are omitted in the following description.

A method for deduplicating entity nodes in a graph database, an apparatus for deduplicating entity nodes in a graph database and a storage medium are described below with reference to the drawings.

Figure 1:
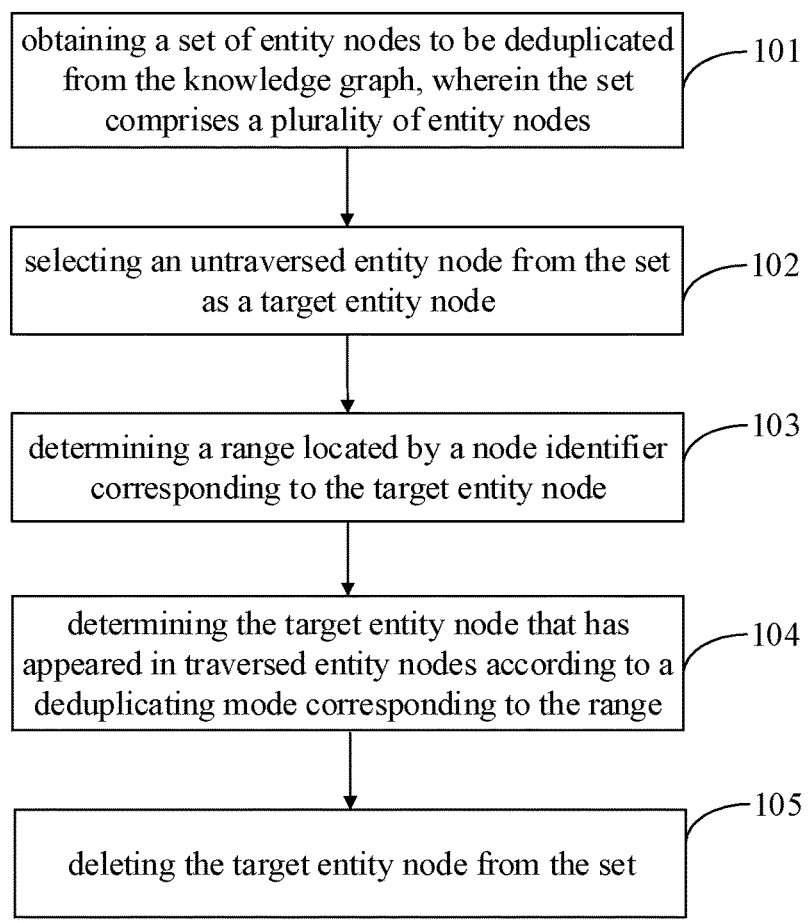
FIG. 1 is a flowchart of a method for deduplicating entity nodes in a graph database according to an embodiment of the disclosure.

FIG. 1 is a flowchart of a method for deduplicating entity nodes in a graph database according to an embodiment of the disclosure.

As illustrated in FIG. 1, the method includes the following.

In 101, a set of entity nodes to be deduplicated are obtained from a knowledge graph, in which the set includes a plurality of entity nodes.

In some embodiments, in the process of performing multi-step graph walk on the graph database, for each step, after obtaining an entity node result from the knowledge graph in the current step, the entity node result obtained by the current step walk can be deduplicated through the method for deduplicating entity nodes in some embodiments, to avoid the walk of repeated entity nodes in the process of the next step of the walk. That is, the entity node result obtained in the current step can be determined as the set of entity nodes to be deduplicated. Deduplication is performed through 102 to 105.

In some embodiments, the graph database in some embodiments can be a distributed graph database based on a design of separate architecture for storage and computation. The graph database includes a plurality of computing nodes and storage nodes, in which each storage node saves a different part of the knowledge graph and a complete knowledge graph can be obtained by splicing the different part of the knowledge graph stored in each storage node. The knowledge graph includes a plurality of entity nodes and connection edges connecting the plurality of entity nodes. It should be noted that the method in some embodiments can be applied to the computing nodes in the graph database.

In addition, it is understood that when the storage nodes deduplicate the queried entity nodes, the method in some embodiments can also be applied to the storage nodes in the graph database.

In 102, an untraversed entity node is selected from the set as a target entity node.

In 103, a range located by a node identifier corresponding to the target entity node is determined.

In some embodiments, a data type of the node identifier can be integer, for example, an 8-byte integer can be adopted to represent the node identifier, and the value range of the node identifier is $1$-$2^{64}$.

In some embodiments, the node identifier of the target entity node can be compared with a plurality of preset ranges. According to a comparison result, the range located by the node identifier of the target node is determined.

For example, if the node identifier of the target entity node is 1000, the value range corresponding to range 1 is $0$-$2^{32}$, the value range corresponding to range 2 is $2^{32}$-$2^{33}$, the value range corresponding to range 3 is $2^{33}$-$3*2^{32}$, the value range corresponding to range 4 is $3*2^{32}$-$2^{34}$, the value range corresponding to range 5 is $2^{34}$-$2^{64}$. At this time, by comparing the node identifier with the value ranges of the above-mentioned ranges, it can be determined that the node identifier 1000 is within the value range $0$-$2^{32}$ corresponding to range 1, and at this time, it is determined that the node identifier of the target node belongs to range 1.

In 104, the target entity node that has appeared in traversed entity nodes is determined according to a deduplicating mode corresponding to the range.

In 105, the target entity node is deleted from the set.

In some embodiments, in the process of walking, for each step, the set of entity nodes obtained at the end of the traversal can be determined as the result of entity nodes after the deduplication in the current step, the next step of walk can be carried out based on the result of entity nodes after the deduplication in the current step.

According to the method for deduplicating entity nodes in the graph database of embodiments of the disclosure, in the process of deduplicating the set of entity nodes to be deduplicated, the entity node that has appeared in the traversed entity nodes is determined according to the deduplicating mode corresponding to the range in combination with the ranges located by the entity node in the set. Moreover, the corresponding entity node is deleted from the set. Therefore, a mode for deduplicating entity nodes is provided, to realize deduplication of entity nodes.

Figure 2:
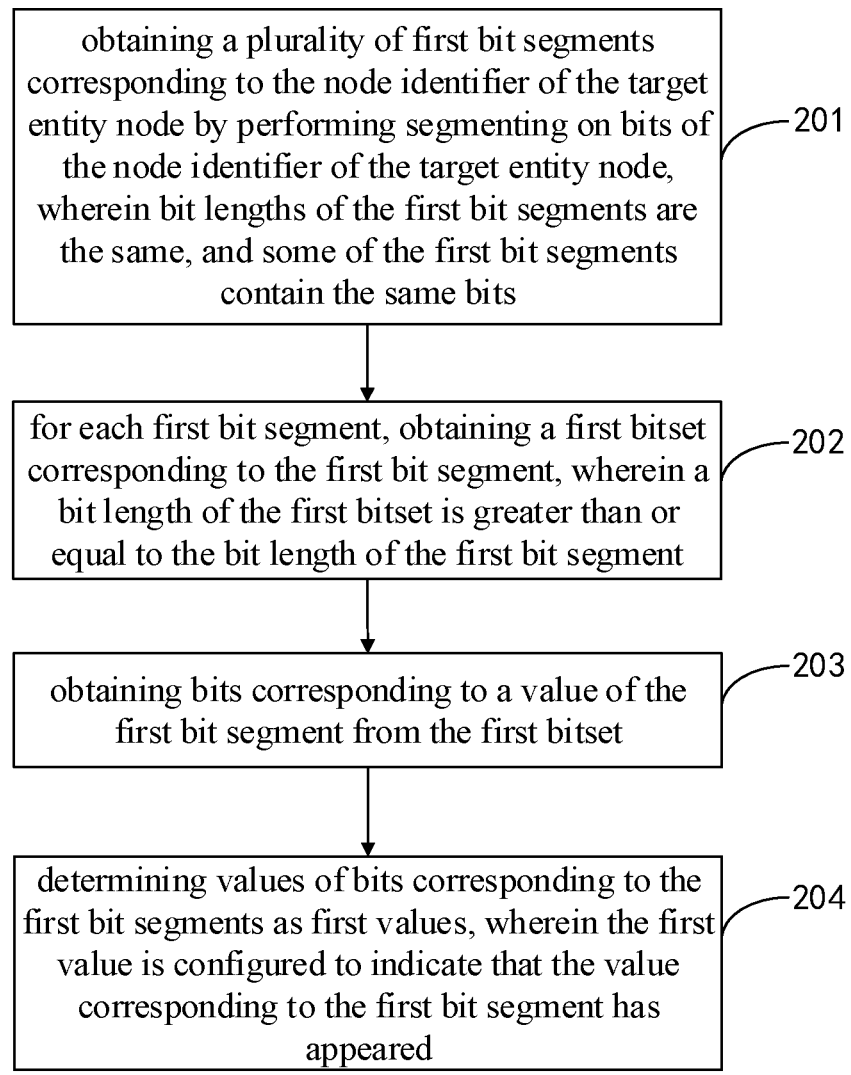
FIG. 2 is a flowchart of a method for deduplicating entity nodes in a graph database according to an embodiment of the disclosure.

Based on the above embodiments, before determining the range located by the node identifier of the target entity node, as illustrated in FIG. 2, the method may further include the following.

In 201, a plurality of first bit segments corresponding to the node identifier of the target entity node are obtained by performing segmenting on bits of the node identifier of the target entity node, in which bit lengths of the first bit segments are the same, and some of the first bit segments contain the same bits.

For example, if the node identifier is an 8-byte integer, the node identifier can be segmented or divided into four segments of 1-20 bits, 12-31 bits, 31-52 bits and 44-63 bits respectively, to obtain four bit segments. The bit lengths of the four bit segments are all 20 bits.

In 202, for each first bit segment, a first bitset corresponding to the first bit segment is obtained, in which a bit length of the first bitset is greater than or equal to the bit length of the first bit segment.

In some embodiments, the bit length of the first bitset and the bit length of the first bit segment are used as examples for description. For example, the bit length of the first bitset and the bit length of the first bit segment are both 20 bits, and correspondingly, the value of each bit in the bitset can be the first value or the second value. The first value is configured to indicate that the value corresponding to the first bit segment has appeared. The second value is configured to indicate that the value corresponding to the first bit segment has not appeared. For example, the first value may be 1 and the second value may be 0.

In 203, bits corresponding to a value of the first bit segment are determined from the first bitset.

In 204, values of bits corresponding to the first bit segments are determined as first values, in which the first value is configured to indicate that the value corresponding to the first bit segment has appeared.

In some embodiments, when it is determined that the values of the bits corresponding to the first bit segments are all the first values, it is determined that the values of the first bit segments corresponding to the node identifier have all appeared. At this time, it may be further determined whether the target entity node exists in the traversed entity nodes in combination with subsequent 103 to 104.

In some embodiments, when it is determined that there is a target bit with a second value in the bits corresponding to the first bit segments, the value of the target bit is adjusted to the first value, it returns to selecting the untraversed entity node from the set as the target entity node. The second value is configured to indicate that a value of a second bit segment corresponding to the target bit has not appeared. That is, when it is determined that there is the target bit with the second value in the bits corresponding to the first bit segments, it can be determined that the target entity node does not exist in the traversed entity nodes. At this time, it is unnecessary to perform 103 to 105 on the target entity node, that is, it is unnecessary to perform deduplication processing on the entity nodes. Therefore, resource overhead can be further reduced.

In different application scenes, for the above-mentioned 104, determining that the target entity node has appeared in the traversed entity nodes are different according to the deduplication mode corresponding to the range. The exemplary description is as follows.

Figure 3:
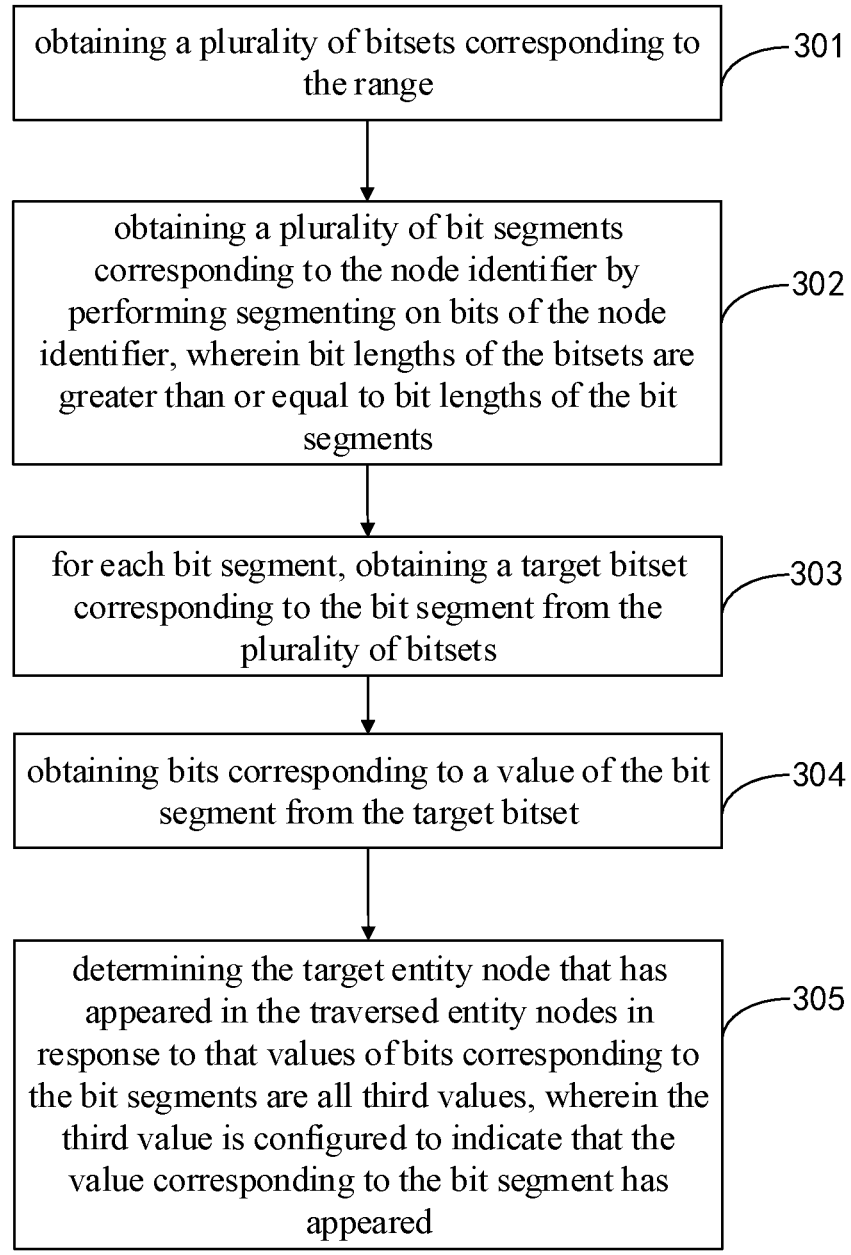
FIG. 3 is a refined flowchart of 104 according to an embodiment of the disclosure.

In an example embodiment, FIG. 3 shows the following.

In 301, a plurality of bitsets corresponding to the range are obtained.

In 302, a plurality of bit segments corresponding to the node identifier are obtained by performing segmenting on bits of the node identifier, in which bit lengths of the bitsets are greater than or equal to bit lengths of the bit segments.

It should be noted that, in order to reduce the memory overhead, in some embodiments, when the entity node belonging to the range can be determined, and the entity node is the first entity node belonging to the range, the plurality of bitsets are initialized. For each bitset, a value of each bit in the bitset is 0.

In 303, for each bit segment, a target bitset corresponding to the bit segment is obtained from the plurality of bitsets.

In 304, bits corresponding to a value of the bit segment are obtained from the target bitset.

In 305, the target entity node that has appeared in the traversed entity nodes is determined in response to that values of bits corresponding to the bit segments are all third values, in which the third value is configured to indicate that the value corresponding to the bit segment has appeared.

In some embodiments, in the process of performing node deduplication on entity nodes, in combination with the plurality of bitsets less than the bit length of the node identifier, the entity nodes are deduplicated, to reduce the memory resource occupied by the bitsets in the deduplication process.

Figure 4:
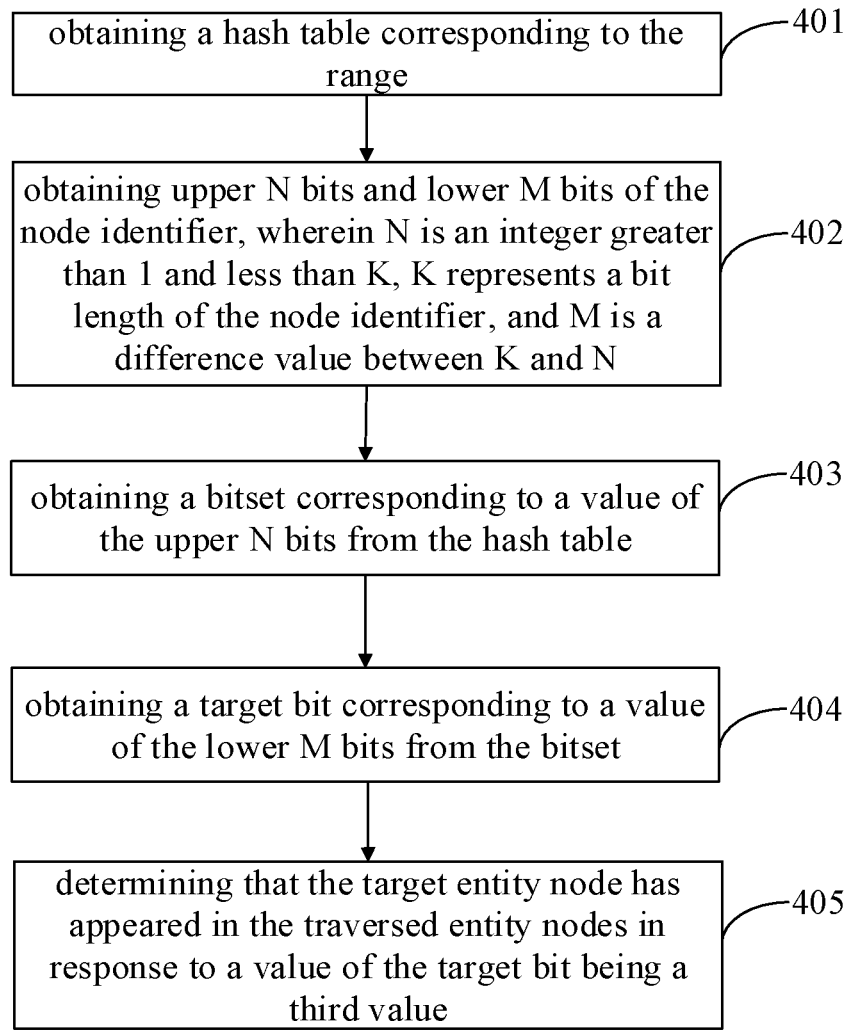
FIG. 4 is a refined flowchart of 104 according to an embodiment of the disclosure.

In a possible example embodiment, FIG. 4 includes the following.

In 401, a hash table corresponding to the range is obtained.

In 402, upper N bits and lower M bits of the node identifier are obtained, in which N is an integer greater than 1 and less than K, K represents a bit length of the node identifier, and M is a difference value between K and N.

For example, an 8-byte integer is used to represent the node identifier of the entity node, and it can be determined that K of the node identifier is 64 bits, and N can be 44. Correspondingly, M is 20.

In 403, a bitset corresponding to a value of the upper N bits is obtained from the hash table.

In 404, a target bit corresponding to a value of the lower M bits is obtained from the bitset.

In 405, it is determined that the target entity node has appeared in the traversed entity nodes in response to a value of the target bit being a third value.

The third value is configured to indicate that the node identifier has appeared.

In some embodiments, deduplication is performed on the entity nodes in combination with the hash table and the bitset, which can reduce the memory resources occupied by the hash table and the bitset, and reduce the memory resource occupied in the process of deduplication.

In a possible example embodiment, the bitset corresponding to the range is obtained. The target bit corresponding to the node identifier is obtained from the bitset. It is determined that the target entity node has appeared in the traversed entity nodes in response to the value of the target bit being the third value.

It should be noted that the bit length of the bitset is the same as the value corresponding to the range.

In some embodiments, in the process of deduplicating the entity nodes, the entity nodes are deduplicated in combination with the bitset smaller than the bits of the node identifier of the entity node, which can reduce the memory consumption occupied by the bitset during the deduplication process.

In another possible example embodiment, the hash table corresponding to the range is obtained. The hash value corresponding to the node identifier is obtained by performing Hash calculation on the node identifier. The at least one candidate value corresponding to the hash value is obtained from the hash table. It is determined that the target entity node has appeared in the traversed entity nodes in response to a candidate value in the at least one candidate value being a third value. The third value is configured to indicate that the node identifier has appeared.

In some embodiments, in the process of deduplicating the entity nodes, the entity nodes are deduplicated in combination with the hash table corresponding to the range located by the node identifier, thereby reducing the time spent for querying the hash table, and reducing the memory consumption.

In order to implement the above embodiments, some embodiments of the disclosure further provide an apparatus for deduplicating entity nodes in a graph database.

Figure 5:
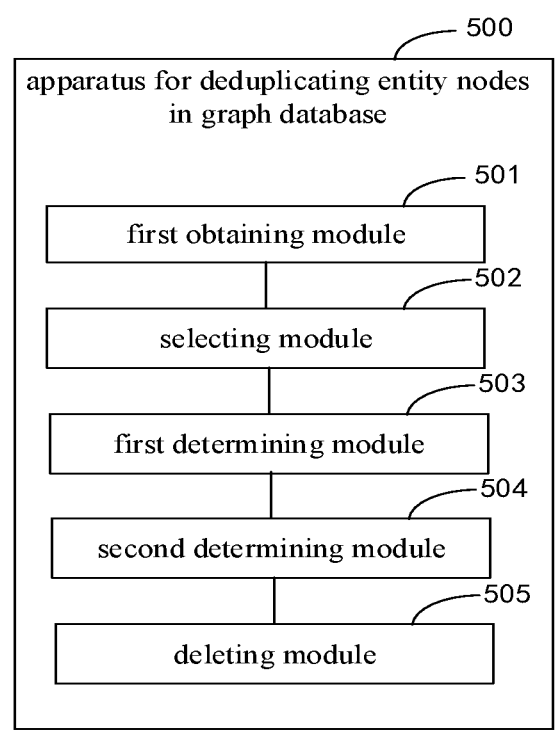
FIG. 5 is a schematic diagram of an apparatus for deduplicating entity nodes in a graph database according to an embodiment of the disclosure.

FIG. 5 is a schematic diagram of an apparatus for deduplicating entity nodes in a graph database according to an embodiment of the disclosure.

As illustrated in FIG. 5, the graph database includes at least one knowledge graph, and the apparatus for deduplicating entity nodes in a graph database 500 includes: a first obtaining module 501, a selecting module 502, a first determining module 503, a second determining module 504 and a deleting module 505.

The first obtaining module 501 is configured to obtain a set of entity nodes to be deduplicated from the knowledge graph, in which the set includes a plurality of entity nodes.

The selecting module 502 is configured to select an untraversed entity node from the set as a target entity node.

The first determining module 503 is configured to determine a range located by a node identifier corresponding to the target entity node.

The second determining module 504 is configured to determine the target entity node that has appeared in traversed entity nodes according to a deduplicating mode corresponding to the range.

The deleting module 505 is configured to delete the target entity node from the set.

It should be noted that the foregoing explanations of embodiments of the method for deduplicating entity nodes in a graph database are also applicable to some embodiments, and are not repeated in some embodiments.

With the apparatus for deduplicating entity nodes in a graph database according to embodiments of the disclosure, in the process of deduplicating the set of entity nodes to be deduplicated, the entity node that has appeared in the traversed entity nodes is determined according to the deduplicating mode corresponding to the range in combination with the ranges located by the entity node in the set. Moreover, the corresponding entity node is deleted from the set. Therefore, a mode for deduplicating entity nodes is provided, to realize deduplication of entity nodes.

Figure 6:
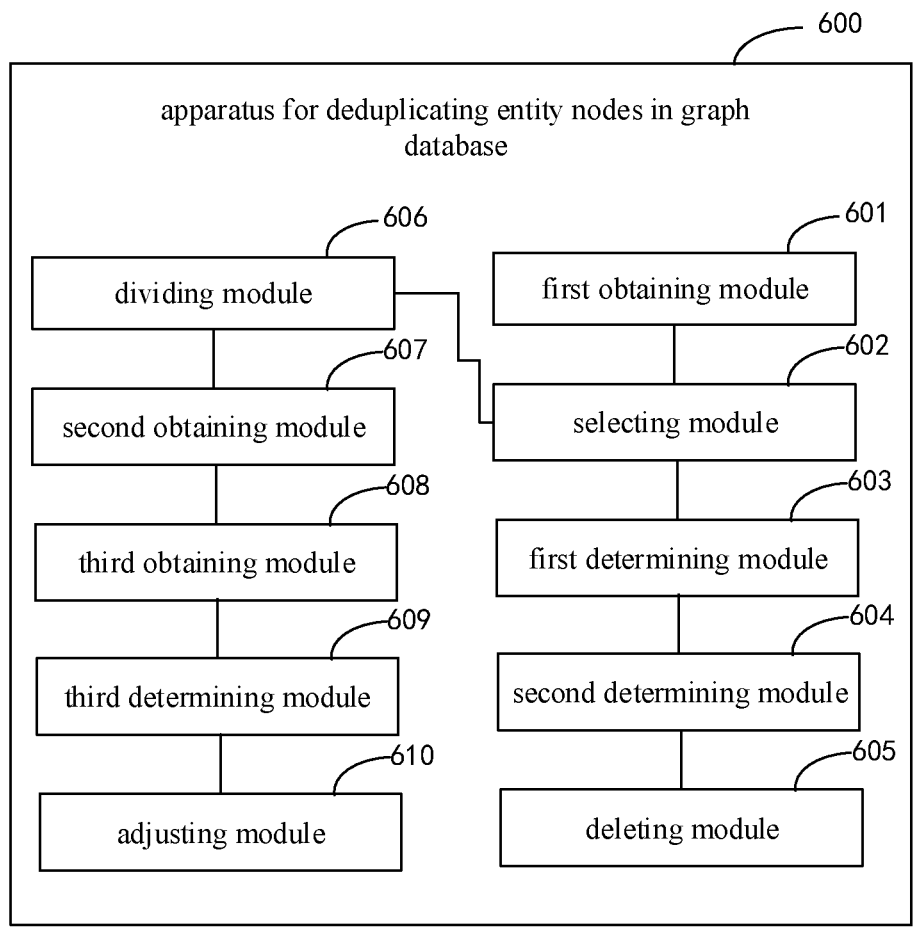
FIG. 6 is a schematic diagram of an apparatus for deduplicating entity nodes in a graph database according to an embodiment of the disclosure.

In an embodiment of the disclosure, as illustrated in FIG. 6, the apparatus for deduplicating entity nodes in a graph database includes: a first obtaining module 601, a selecting module 602, a first determining module 603, a second determining module 604, a deleting module 605, a dividing module 606, a second obtaining module 607, a third obtaining module 608, a third determining module 609, and an adjusting module 610.

The dividing module 606 is configured to obtain a plurality of first bit segments corresponding to the node identifier of the target entity node by performing segmenting on bits of the node identifier of the target entity node, in which bit lengths of the first bit segments are the same, and some of the first bit segments contain the same bits.

The second obtaining module 607 is configured to, for each first bit segment, obtain a first bitset corresponding to the first bit segment, in which a bit length of the first bitset is greater than or equal to the bit length of the first bit segment.

The third obtaining module 608 is configured to obtain bits corresponding to a value of the first bit segment from the first bitset.

The third determining module 609 is configured to determine values of bits corresponding to the first bit segments as first values, in which the first value is configured to indicate that the value corresponding to the first bit segment has appeared.

For detailed descriptions of the first obtaining module 601, the selecting module 602, the first determining module 603, the second determining module 604, and the deleting module 605, reference should be made to the descriptions of the first obtaining module 501, the selecting module 502, the first determining module 503, the second determining module 504, and the deleting module 505 in embodiments shown in FIG. 6, which will not be described again.

In an embodiment of the disclosure, as illustrated in FIG. 6, the apparatus further includes: an adjusting module 610, configured to, in response to determining that there is a target bit with a second value in the bits corresponding to the first bit segments, adjust the second value of the target bit to the first value, and return to selecting the untraversed entity node from the set as the target entity node. The second value is configured to indicate that a value of a second bit segment corresponding to the target bit has not appeared.

In an embodiment of the disclosure, the second determining module 604 is further configured to: obtain a plurality of bitsets corresponding to the range; obtain a plurality of second bit segments corresponding to the node identifier by performing segmenting on bits of the node identifier, in which bit lengths of the bitsets are greater than or equal to bit lengths of the second bit segments; for each second bit segment, obtain a target bit set corresponding to the second bit segment from the plurality of bitsets; obtain bits corresponding to a value of the second bit segment from the target bitset; and determine the target entity node that has appeared in the traversed entity nodes in response to that values of bits corresponding to the second bit segments are all third values, in which the third value is configured to indicate that the value corresponding to the second bit segment has appeared.

In an embodiment of the disclosure, the second determining module 604 is further configured to: obtain a hash table corresponding to the range; obtain upper N bits and lower M bits of the node identifier, N is an integer greater than 1 and less than K, K represents a bit length of the node identifier, and M is a difference value between K and N; obtain a bitset corresponding to a value of the upper N bits from the hash table; obtain a target bit corresponding to a value of the lower M bits from the bitset; and determine that the target entity node has appeared in the traversed entity nodes in response to a value of the target bit being a third value. The third value is configured to indicate that the value of the lower M bits has appeared.

In an embodiment of the disclosure, the second determining module 604 is further configured to: obtain a bitset corresponding to the range; obtain a target bit corresponding to the node identifier from the bitset; determine that the target entity node has appeared in the traversed entity nodes in response to a value of the target bit being a third value, in which the third value is configured to indicate that the node identifier has appeared.

In an embodiment of the disclosure, the second determining module 604 is further configured to: obtain a hash table corresponding to the range; obtain a hash value corresponding to the node identifier by performing Hash calculation on the node identifier; obtain at least one candidate value corresponding to the hash value from the hash table; determine that the target entity node has appeared in the traversed entity nodes in response to a candidate value in the at least one candidate value being a third value.

It should be noted that, the foregoing explanations of embodiments of the method for deduplicating entity nodes in a graph database are also applicable to the apparatus for deduplicating entity nodes in a graph database in some embodiments, which will not be repeated here.

According to some embodiments of the disclosure, the disclosure also provides an electronic device, a readable storage medium and a computer program product.

Figure 7:
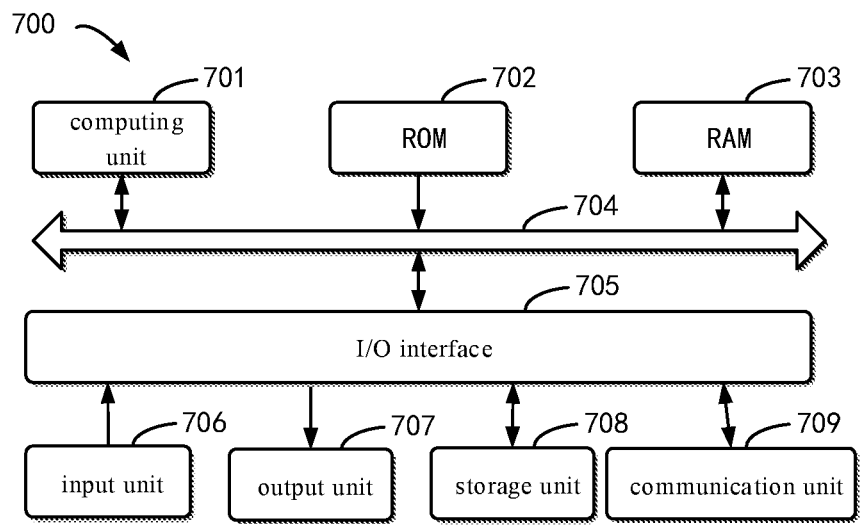
FIG. 7 is a block diagram of an electronic device for implementing a method for deduplicating entity nodes in a graph database according to an embodiment of the disclosure.

FIG. 7 is a block diagram of an example electronic device 700 used to implement some embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the device 700 includes a computing unit 701 performing various appropriate actions and processes based on computer programs stored in a read-only memory (ROM) 702 or computer programs loaded from the storage unit 708 to a random access memory (RAM) 703. In the RAM 703, various programs and data required for the operation of the device 700 are stored. The computing unit 701, the ROM 702, and the RAM 703 are connected to each other through a bus 704. An input/output (I/O) interface 705 is also connected to the bus 704.

Components in the device 700 are connected to the I/O interface 705, including: an inputting unit 706, such as a keyboard, a mouse; an outputting unit 707, such as various types of displays, speakers; a storage unit 708, such as a disk, an optical disk; and a communication unit 709, such as network cards, modems, and wireless communication transceivers. The communication unit 709 allows the device 700 to exchange information/data with other devices through a computer network such as the Internet and/or various telecommunication networks.

The computing unit 701 may be various general-purpose and/or dedicated processing components with processing and computing capabilities. Some examples of computing unit 701 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 701 executes the various methods and processes described above, such as the method for deduplicating entity nodes in a graph database. For example, in some embodiments, the method may be implemented as a computer software program, which is tangibly contained in a machine-readable medium, such as the storage unit 708. In some embodiments, part or all of the computer program may be loaded and/or installed on the device 700 via the ROM 702 and/or the communication unit 709. When the computer program is loaded on the RAM 703 and executed by the computing unit 701, one or more steps of the method described above may be executed. Alternatively, in other embodiments, the computing unit 701 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and a block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in a cloud computing service system, in order to solve the existing defects of difficult management and weak business expansion in traditional physical hosting and virtual private server (VPS) services. The server can also be a cloud server, a server of a distributed system, or a server combined with a block-chain.

It should be noted that artificial intelligence (AI) is a discipline that allows computers to simulate certain thinking processes and intelligent behaviors (such as learning, reasoning, thinking and planning) of human, which has both hardware-level technology and software-level technology. AI hardware technologies generally include technologies such as sensors, dedicated AI chips, cloud computing, distributed storage, and big data processing. AI software technologies mainly include computer vision technology, speech recognition technology, natural language processing technology and machine learning/depth learning, big data processing technology, knowledge graph technology and other major directions.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for deduplicating entity nodes in a graph database, wherein the graph database comprises at least one knowledge graph, the graph database is a distributed graph database based on a design of separate architecture for storage and computation, the graph database comprises a plurality of computing nodes and storage nodes, each storage node saves a different part of the knowledge graph and the knowledge graph is obtained by splicing the different part of the knowledge graph stored in each storage node, and the method is performed by the computing node in the plurality of computing nodes and comprises:
   obtaining a set of entity nodes to be deduplicated from the knowledge graph, wherein the set comprises a plurality of entity nodes, wherein the computing node performs multi-step graph walk on the graph database, and an entity node result is obtained for a current step from the knowledge graph is determined as the set of entity nodes to be deduplicated;
   selecting an untraversed entity node from the set as a target entity node;
   determining a range located by a node identifier corresponding to the target entity node;
   determining the target entity node that has appeared in traversed entity nodes according to a deduplicating mode corresponding to the range, wherein the traversed entity nodes comprise entity nodes after deduplication in previous steps;
   deleting the target entity node from the set;

obtaining a plurality of first bit segments corresponding to the node identifier of the target entity node by performing segmenting on bits of the node identifier of the target entity node, wherein bit lengths of the first bit segments are the same, and some of the first bit segments contain the same bits;

for each first bit segment, obtaining a first bitset corresponding to the first bit segment, wherein a bit length of the first bitset is greater than or equal to the bit length of the first bit segment;

obtaining bits corresponding to a value of the first bit segment from the first bitset, and determining values of bits corresponding to the first bit segments as first values, wherein the first value is configured to indicate that the value corresponding to the first bit segment has appeared.

2. The method of claim 1, further comprising:

in response to determining that there is a target bit with a second value in the bits corresponding to the first bit segments, adjusting the second value of the target bit to the first value, and returning to selecting the untraversed entity node from the set as the target entity node, wherein the second value is configured to indicate that a value of a second bit segment corresponding to the target bit has not appeared.

3. The method of claim 1, wherein determining the target entity node that has appeared in the traversed entity nodes according to the deduplicating mode corresponding to the range, comprises:

obtaining a plurality of bitsets corresponding to the range;

obtaining a plurality of second bit segments corresponding to the node identifier by performing segmenting on bits of the node identifier, wherein bit lengths of the bitsets are greater than or equal to bit lengths of the second bit segments;

for each second bit segment, obtaining a target bitset corresponding to the second bit segment from the plurality of bitsets;

obtaining bits corresponding to a value of the second bit segment from the target bitset; and determining the target entity node that has appeared in the traversed entity nodes in response to that values of bits corresponding to the second bit segments are all third values, wherein the third value is configured to indicate that the value corresponding to the second bit segment has appeared.

4. The method of claim 1, wherein determining the target entity node that has appeared in the traversed entity nodes according to the deduplicating mode corresponding to the range, comprises:

obtaining a hash table corresponding to the range;

obtaining upper N bits and lower M bits of the node identifier, wherein N is an integer greater than 1 and less than K, K represents a bit length of the node identifier, and M is a difference value between K and N;

obtaining a bitset corresponding to a value of the upper N bits from the hash table;

obtaining a target bit corresponding to a value of the lower M bits from the bitset; and determining that the target entity node has appeared in the traversed entity nodes in response to a value of the target bit being a third value.

5. The method of claim 1, wherein determining the target entity node that has appeared in the traversed entity nodes according to the deduplicating mode corresponding to the range, comprises:

obtaining a bitset corresponding to the range;

obtaining a target bit corresponding to the node identifier from the bitset;

determining that the target entity node has appeared in the traversed entity nodes in response to a value of the target bit being a third value, wherein the third value is configured to indicate that the node identifier has appeared.

6. The method of claim 1, wherein determining the target entity node that has appeared in the traversed entity nodes according to the deduplicating mode corresponding to the range, comprises:

obtaining a hash table corresponding to the range;

obtaining a hash value corresponding to the node identifier by performing Hash calculation on the node identifier;

obtaining at least one candidate value corresponding to the hash value from the hash table;

determining that the target entity node has appeared in the traversed entity nodes in response to a candidate value in the at least one candidate value being a third value.

7. An electronic device for deduplicating entity nodes in a graph database, wherein the graph database comprises at least one knowledge graph, the graph database is a distributed graph database based on a design of separate architecture for storage and computation, the graph database comprises a plurality of computing nodes and storage nodes, each storage node saves a different part of the knowledge graph and the knowledge graph is obtained by splicing the different part of the knowledge graph stored in each storage node, the electronic device is the computing node in the plurality of computing nodes and comprises:

at least one processor; and a memory communicatively coupled to the at least one processor; wherein, the memory is configured to store instructions executable by the at least one processor, and when the instructions are executed by the at least one processor, the at least one processor is enabled to implement:

obtaining a set of entity nodes to be deduplicated from a knowledge graph, wherein the set comprises a plurality of entity nodes, wherein the computing node performs multi-step graph walk on the graph database, and an entity node result is obtained for a current step from the knowledge graph is determined as the set of entity nodes to be deduplicated;

selecting an untraversed entity node from the set as a target entity node;

determining a range located by a node identifier corresponding to the target entity node, wherein the traversed entity nodes comprise entity nodes after deduplication in previous steps;

determining the target entity node that has appeared in traversed entity nodes according to a deduplicating mode corresponding to the range;

deleting the target entity node from the set;

obtaining a plurality of first bit segments corresponding to the node identifier of the target entity node by performing segmenting on bits of the node identifier of the target entity node, wherein bit lengths of the first bit segments are the same, and some of the first bit segments contain the same bits;

for each first bit segment, obtaining a first bitset corresponding to the first bit segment, wherein a bit length of the first bitset is greater than or equal to the bit length of the first bit segment;

obtaining bits corresponding to a value of the first bit segment from the first bitset; and determining values of bits corresponding to the first bit segments as first values, wherein the first value is configured to indicate that the value corresponding to the first bit segment has appeared.

8. The electronic device of claim 7, wherein when the instructions are executed by the at least one processor, the at least one processor is enabled to implement:

in response to determining that there is a target bit with a second value in the bits corresponding to the first bit segments, adjusting the second value of the target bit to the first value, and returning to selecting the untraversed entity node from the set as the target entity node, wherein the second value is configured to indicate that a value of a second bit segment corresponding to the target bit has not appeared.

9. The electronic device of claim 7, wherein when the instructions are executed by the at least one processor, the at least one processor is enabled to implement:

obtaining a plurality of bitsets corresponding to the range;
obtaining a plurality of second bit segments corresponding to the node identifier by performing segmenting on bits of the node identifier, wherein bit lengths of the bitsets are greater than or equal to bit lengths of the second bit segments;
for each second bit segment, obtaining a target bitset corresponding to the second bit segment from the plurality of bitsets;
obtaining bits corresponding to a value of the second bit segment from the target bitset; and
determining the target entity node that has appeared in the traversed entity nodes in response to that values of bits corresponding to the second bit segments are all third values, wherein the third value is configured to indicate that the value corresponding to the second bit segment has appeared.

10. The electronic device of claim 7, wherein when the instructions are executed by the at least one processor, the at least one processor is enabled to implement:

obtaining a hash table corresponding to the range;
obtaining upper N bits and lower M bits of the node identifier, wherein N is an integer greater than 1 and less than K, K represents a bit length of the node identifier, and M is a difference value between K and N;
obtaining a bitset corresponding to a value of the upper N bits from the hash table;
obtaining a target bit corresponding to a value of the lower M bits from the bitset; and
determining that the target entity node has appeared in the traversed entity nodes in response to a value of the target bit being a third value.

11. The electronic device of claim 7, wherein when the instructions are executed by the at least one processor, the at least one processor is enabled to implement:

obtaining a bitset corresponding to the range;
obtaining a target bit corresponding to the node identifier from the bitset;
determining that the target entity node has appeared in the traversed entity nodes in response to a value of the target bit being a third value, wherein the third value is configured to indicate that the node identifier has appeared.

12. The electronic device of claim 7, wherein when the instructions are executed by the at least one processor, the at least one processor is enabled to implement:

obtaining a hash table corresponding to the range;
obtaining a hash value corresponding to the node identifier by performing Hash calculation on the node identifier;
obtaining at least one candidate value corresponding to the hash value from the hash table;
determining that the target entity node has appeared in the traversed entity nodes in response to a candidate value in the at least one candidate value being a third value.

13. A non-transitory computer-readable storage medium having computer instructions stored thereon, wherein the computer instructions are configured to cause a computer to implement a method for deduplicating entity nodes in a graph database, wherein the graph database comprises at least one knowledge graph, the graph database is a distributed graph database based on a design of separate architecture for storage and computation, the graph database comprises a plurality of computing nodes and storage nodes, each storage node saves a different part of the knowledge graph and the knowledge graph is obtained by splicing the different part of the knowledge graph stored in each storage node, and the computer is the computing node in the plurality of computing nodes and the method comprises:

obtaining a set of entity nodes to be deduplicated from the knowledge graph, wherein the set comprises a plurality of entity nodes, wherein the computing node performs multi-step graph walk on the graph database, and an entity node result is obtained for a current step from the knowledge graph is determined as the set of entity nodes to be deduplicated;
selecting an untraversed entity node from the set as a target entity node;
determining a range located by a node identifier corresponding to the target entity node, wherein the traversed entity nodes comprise entity nodes after deduplication in previous steps;
determining the target entity node that has appeared in traversed entity nodes according to a deduplicating mode corresponding to the range;
deleting the target entity node from the set;
obtaining a plurality of first bit segments corresponding to the node identifier of the target entity node by performing segmenting on bits of the node identifier of the target entity node, wherein bit lengths of the first bit segments are the same, and some of the first bit segments contain the same bits;
for each first bit segment, obtaining a first bitset corresponding to the first bit segment, wherein a bit length of the first bitset is greater than or equal to the bit length of the first bit segment;
obtaining bits corresponding to a value of the first bit segment from the first bitset; and
determining values of bits corresponding to the first bit segments as first values, wherein the first value is configured to indicate that the value corresponding to the first bit segment has appeared.

14. The non-transitory computer-readable storage medium of claim 13, wherein determining the target entity node that has appeared in the traversed entity nodes according to the deduplicating mode corresponding to the range, comprises:

obtaining a plurality of bitsets corresponding to the range;
obtaining a plurality of second bit segments corresponding to the node identifier by performing segmenting on bits of the node identifier, wherein bit lengths of the bitsets are greater than or equal to bit lengths of the second bit segments;

for each second bit segment, obtaining a target bitset corresponding to the second bit segment from the plurality of bitsets;

obtaining bits corresponding to a value of the second bit segment from the target bitset; and determining the target entity node that has appeared in the traversed entity nodes in response to that values of bits corresponding to the second bit segments are all third values, wherein the third value is configured to indicate that the value corresponding to the second bit segment has appeared.

15. The non-transitory computer-readable storage medium of claim 13, wherein determining the target entity node that has appeared in the traversed entity nodes according to the deduplicating mode corresponding to the range, comprises:

obtaining a hash table corresponding to the range;

obtaining upper N bits and lower M bits of the node identifier, wherein N is an integer greater than 1 and less than K, K represents a bit length of the node identifier, and M is a difference value between K and N;

obtaining a bitset corresponding to a value of the upper N bits from the hash table;

obtaining a target bit corresponding to a value of the lower M bits from the bitset; and determining that the target entity node has appeared in the traversed entity nodes in response to a value of the target bit being a third value.

16. The non-transitory computer-readable storage medium of claim 13, wherein determining the target entity node that has appeared in the traversed entity nodes according to the deduplicating mode corresponding to the range, comprises:

obtaining a bitset corresponding to the range;

obtaining a target bit corresponding to the node identifier from the bitset;

determining that the target entity node has appeared in the traversed entity nodes in response to a value of the target bit being a third value, wherein the third value is configured to indicate that the node identifier has appeared.

17. The non-transitory computer-readable storage medium of claim 13, wherein determining the target entity node that has appeared in the traversed entity nodes according to the deduplicating mode corresponding to the range, comprises:

obtaining a hash table corresponding to the range;

obtaining a hash value corresponding to the node identifier by performing Hash calculation on the node identifier;

obtaining at least one candidate value corresponding to the hash value from the hash table;

determining that the target entity node has appeared in the traversed entity nodes in response to a candidate value in the at least one candidate value being a third value.

* * * * *